United States Patent
Georgakis

(10) Patent No.: US 8,898,689 B2
(45) Date of Patent: Nov. 25, 2014

(54) METHOD AND ARRANGEMENTS FOR ANALYSING MULTIMEDIA CONTENT

(75) Inventor: Apostolos Georgakis, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/382,559

(22) PCT Filed: Jul. 8, 2009

(86) PCT No.: PCT/SE2009/050881
§ 371 (c)(1),
(2), (4) Date: Jan. 6, 2012

(87) PCT Pub. No.: WO2011/005155
PCT Pub. Date: Jan. 13, 2011

(65) Prior Publication Data
US 2012/0124607 A1    May 17, 2012

(51) Int. Cl.
| | | |
|---|---|---|
| *H04H 60/32* | (2008.01) | |
| *H04H 60/33* | (2008.01) | |
| *H04N 21/258* | (2011.01) | |
| *H04N 21/2668* | (2011.01) | |
| *H04N 21/234* | (2011.01) | |
| *H04H 60/45* | (2008.01) | |
| *H04N 21/466* | (2011.01) | |
| *G06Q 30/02* | (2012.01) | |
| *H04N 21/25* | (2011.01) | |
| *H04H 60/66* | (2008.01) | |

(52) U.S. Cl.
CPC ......... *G06Q 30/02* (2013.01); *H04N 21/25883* (2013.01); *H04N 21/2668* (2013.01); *H04N 21/23424* (2013.01); *H04N 21/25891* (2013.01); *H04H 60/45* (2013.01); *H04N 21/4663* (2013.01); *H04N 21/251* (2013.01); *H04H 60/66* (2013.01)

USPC .................. 725/20; 725/10; 725/14; 725/19

(58) Field of Classification Search
USPC ...................... 725/9–14, 19–20, 22
See application file for complete search history.

(56) References Cited

U.S. PATENT DOCUMENTS

| 5,721,827 A | 2/1998 | Logan et al. |
| 5,943,371 A * | 8/1999 | Beale et al. .................. 375/341 |

(Continued)

FOREIGN PATENT DOCUMENTS

| JP | 2003018584 A | 1/2003 |
| JP | 2006-524009 A | 10/2006 |

(Continued)

OTHER PUBLICATIONS

Office Action dated Feb. 11, 2014, issued in Chinese Patent Application No. 200980160340.8, 15 pages.

(Continued)

*Primary Examiner* — Gigi L Dubasky
(74) *Attorney, Agent, or Firm* — Rothwell, Figg, Ernst & Manbeck, P.C.

(57) ABSTRACT

A method and arrangements at a multimedia distribution network for estimating a present user constellation of a household are suggested. A sequence of textual descriptors that are associated with a multimedia sequence that is presently provided to the household is monitored. By acquiring a set of parameters of a statistical model that is based on textual descriptors that have previously been provided to the household, and by estimating a present user constellation by correlating the sequence of textual descriptors with the parameters of the statistical model, the estimated information may be used for customization of content that is provided to the household.

16 Claims, 6 Drawing Sheets

(56) References Cited

U.S. PATENT DOCUMENTS

| | | | |
|---|---|---|---|
| 6,545,587 B1 * | 4/2003 | Hatakeyama et al. | 340/3.31 |
| 7,150,030 B1 | 12/2006 | Eldering et al. | |
| 2003/0101449 A1 | 5/2003 | Bentolila et al. | |
| 2003/0101451 A1 | 5/2003 | Bentolita et al. | |
| 2007/0011039 A1 * | 1/2007 | Oddo | 705/10 |
| 2007/0092114 A1 * | 4/2007 | Ritter et al. | 382/115 |
| 2007/0199017 A1 | 8/2007 | Cozen et al. | |
| 2008/0244665 A1 | 10/2008 | Bowen et al. | |
| 2009/0133058 A1 | 5/2009 | Kouritzin et al. | |

FOREIGN PATENT DOCUMENTS

| | | | |
|---|---|---|---|
| WO | 2004088457 A2 | 10/2004 | |
| WO | 2007131069 A2 | 11/2007 | |

OTHER PUBLICATIONS

Office Action issued on Jul. 2, 2013, in corresponding Japanese Application No. 2012-519498, 2 pages.

Hideki Yamamoto metade-ta wo meguru gijutsudoki [Technical trends surrounding metadata], Oki Tekunikaru rebyu [Oki Technical Review], Oki Electric Industry Co., Ltd., Jan. 1, 2004, vol. 71, No. 1, pp. 130-133, 7 pages.

Notice of Reasons for Rejection issued on Dec. 17, 2013, in corresponding Japanese Application No. 2012-519498, 2 pages.

Extended European Search Report issued on Dec. 5, 2013, in corresponding European Application No. 09847152.7, 6 pages.

* cited by examiner

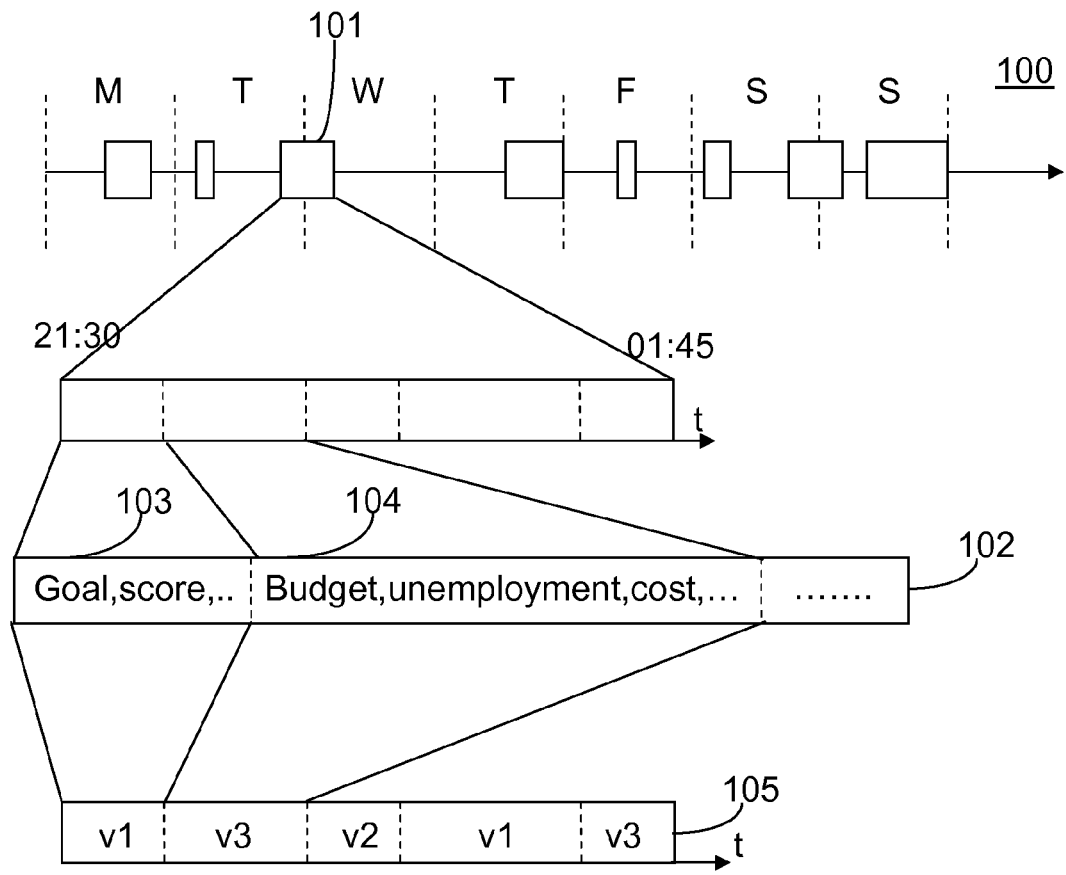
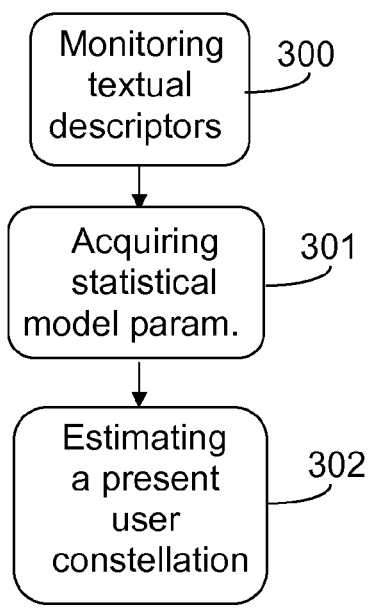
Figure 1
Figure 3

METHOD AND ARRANGEMENTS FOR ANALYSING MULTIMEDIA CONTENT

CROSS-REFERENCE TO RELATED APPLICATION

This application is a 35 U.S.C. §371 National Phase Entry Application from PCT/SE2009/050881, filed Jul. 8, 2009, and designating the United States.

TECHNICAL FIELD

This document refers to a method and arrangements for estimating a constellation of users at a household while distributed multimedia content is being consumed at the household.

BACKGROUND

Today partial personalization of content distributed to viewers via a multimedia distribution network, such as e.g. a TV distribution network, can be achieved by using specialized hardware on the viewer's side. A major disadvantage with such an approach is that it is often disruptive to the viewer's Quality of Experience (QoE).

Personalization without requiring any specialized equipment on the user viewer's side has not yet been practically exhibited, due to at least the following problems.

Real time estimation of the identity of the current viewer/s is extremely difficult and costly, if not impossible, considering presently known technique.

Personal preferences are hard to estimate, and only rough estimations, typically on the basis of demographic, economic and/or social factors, may be obtained.

Households might have more than one TV viewer with different personal preferences. The placement of a TV advertisement or a TV program in any of the above scenarios is not optimal because it will not enable a content provider to meet the needs of each individual viewer. A mechanism guarantying that the individual needs are fulfilled and personal preferences are met would be optimal. The techniques employed today for the selection of the advertisements or TV programs to be shown for different viewers are not optimal due to the information asymmetry between the viewers and the content providers, or advertising companies.

The existing techniques cannot achieve a perfect mapping between the viewer's preferences and the content to be delivered to viewers, in response to selections made by the viewers, because primarily the content provider or advertiser does neither know the number of viewers per household, their daily routines regarding the time of the day spend in front of the TV, nor their preferences. Some of these parameters can only be estimated with a limited probability, using presently available technique.

One approach to use for trying to solve at least some of the problems mentioned above is to apply user-log-files, or diaries, which are typically edited by a selected group of viewers, or consumers, over a specified time interval, in order to document a user behavior of a constellation of users of a household. This approach has considerable deficiencies when it comes to accuracy, since it rely on a high grade of participation and activity of the participating viewers for obtaining accurate representation of their daily habits, and additionally it always has an intrinsic time threshold, typically defined as 15 minutes intervals, below which no viewer activity is recorded.

Another known method for documenting a user behavior is to use set-meters, which are configured to passively record the set-tunings of a household and to transmit these recordings to a central unit.

Yet another known user behavior documentation method rely on the so-called people-meter, where selected households are equipped with small set-to-boxes, specially adapted for documentation purposes. When a viewer starts watching programs on a TV set that is equipped with a people-meter, the viewer has to actively press a button on the people-meter, or on a corresponding remote control, in order to be able to indicate his/her identity. An alternative to people-meter, called Portable People-Meter (PPM) is provides a portable alternative, with a device that can be worn by an individual that captures inaudible signals embedded in an audio stream that is received by a TV set of the household.

Another problem that relates to the problem of trying to picture a user's behavior in the present context is that non-intrusive solutions to the mentioned problems may be confronted by selecting a representative population of viewers on the basis of demographic, economic and/or social factors, whereas intrusive techniques may employ call-ins and/or questioners.

There are a number of additional problems with using any of the suggested solutions, some of which are presented below.

Having a registering device installed at a household infringes a person's privacy. Another problem is that any kind of activity required by a viewer, such as e.g. filling in some kind of form, pushing buttons, or answering telephone calls, disturbs the user experience of the viewer. In addition, practically all known methods are relatively costly to set up and to maintain, considering the equipment and/or required man-hours.

Since the viewers that have been selected to participate in a user behavior survey always represent a limited group of all viewers, this group will be more or less representative. How representative a selected group actually is may be very difficult to estimate. There is also a large risk of incomplete coverage, where the user behavior of an important group of viewers cannot be registered.

SUMMARY

It is an object of the present invention to address at least some of the problems outlined above. More specifically it is an object of the present invention to provide a mechanism for training a statistical model on the user behaviour of a household and to enable a later estimation of a user constellation of the household on the basis of the trained model. On the basis of the estimated user constellation, an estimated user behaviour may be used as a selection criteria for selective distribution of user content to the household.

According to one aspect, a method to be executed at a multimedia distribution network is provided, which enables estimation of a present user constellation of a household to which multimedia content is distributed.

According to one exemplifying embodiment, such a method is achieved by monitoring a sequence of textual descriptors that are associated with a multimedia sequence, comprising e.g. audio and/or video content, which is being distributed to the household. By acquiring a set of probabilistic parameters of a statistical model that is based on textual descriptors that have previously been provided to the household, typically from a storage unit, a present user constellation may be estimated by correlating the monitored sequence of textual descriptors with the parameters of the statistical model.

The estimating step may be performed by executing, on the fly, a Viterbi decoding on the stream of textual descriptors and the set of parameters.

By acquiring information on the present user constellation, e.g. user preference information of the estimated user constellation, and by providing this information to a content provider, the content provider will be able to selectively customize multimedia content, such as e.g. video, audio, TV programs, and/or advertisements, that is provided to the household on the basis of the provided user preference information.

The statistical model may be determined by executing an initial training phase. According to one exemplary embodiment, such an initial phase is performed by acquiring a plurality of sequences of textual descriptors that have previously been monitored and stored, each sequence of textual descriptors being associated with a multimedia sequence that has previously been provided to the household.

A statistical analysis is then performed on the acquired sequences of textual descriptors, such that the statistical model defined by a finite number, N, of most likely user constellations and the set of probabilistic parameters associated with state transitions of the most likely user constellations is generated. The initial phase is then completed by storing the probabilistic parameters that defines the statistical model.

In addition to monitored information, the statistical analysis may be based on additional, user specific, information, such as e.g. one or more of possible number of users at the household, socioeconomic information and/or user preferences associated with the household.

According to one alternative aspect, the performing step is executed by using a Baum-Welch algorithm on the acquired sequences of textual descriptors.

The statistical model may be generated by a dynamic Bayesian network (DBN). Such a DBN may be any of a Hidden Markov model, a Multi-resolution Hidden Markov model or a Hidden semi-Markov model, wherein each monitored sequence of textual descriptors may represent a sequence of observations and the N user constellations may represent a sequence of hidden states.

The sequences of textual descriptors may be monitored from metadata, subtitle information or tag information, that is being distributed parallel to, or simultaneously with, its associated multimedia sequence.

According to another aspect, an arrangement that is suitable for estimating a user constellation is also provided. Such an arrangement comprises a monitoring unit, which is adapted to monitor a sequence of textual descriptors that is associated with a multimedia sequence, that is being distributed to a household.

The arrangement also comprises a correlating unit, which is adapted to acquire a set of probabilistic parameters of a statistical model that is based on a plurality of sequences of textual descriptors that have previously been provided to the household, and to estimate a present user constellation by correlating the sequence of textual descriptors with the parameters of the statistical model.

The correlating unit is typically adapted to acquire the set of parameters from a storing unit, and may also be adapted to estimate a most probable present user constellation by executing on the fly Viterbi decoding on the sequence of textual descriptors and the acquired set of parameters.

The arrangement may also comprise a communication unit that is adapted to acquire user preference information on the present user constellation, and to provide this user preference information to a content provider, such that the content provider is allowed to customize multimedia content provided to the household on the basis of the provided user preference information.

In a typical scenario, the suggested arrangement is part of a multimedia distribution network.

According to another aspect, another arrangement that is suitable for executing the initial training sequence, is also provided. More specifically, an arrangement for determining a statistical model on user constellations of a household is provided which comprises a monitoring unit, interconnected with an estimating unit, and a storing unit. The monitoring unit is configured to monitor, during a long-term time interval, a plurality of sequences of textual descriptors, each of which is being associated with a multimedia sequence that is simultaneously provided to the household, and to store the monitored sequences in a first storing unit, or a database. The estimating unit is adapted to perform a statistical analysis on the monitored sequences of textual descriptors, such that a statistical model, defined by a finite number, N, of most likely user constellations and a set of probabilistic parameters associated with state transitions of the most likely user constellations, are generated, while the storing unit (409) is adapted to store the probabilistic parameters that define the statistical model.

The estimating unit may be adapted also to consider additional user specific information, such as one or more of e.g. possible number of users at the household, socioeconomic information and/or user preferences, when the statistical analysis is executed.

Further possible features and benefits of the invention will become apparent from the detailed description below.

BRIEF DESCRIPTION OF THE DRAWINGS

The present invention will now be described in more detail by means of exemplary embodiments and with reference to the accompanying drawings in which:

FIG. 1 is a schematic illustration of how textual descriptors may relate to user constellations, according to one exemplary embodiment.

FIG. 3 is another flow chart, illustrating how a statistical model obtained according to the method described with reference to FIG. 2 may be used for estimating a most probable present user constellation, according to one exemplary embodiment.

DETAILED DESCRIPTION

Figure 2:
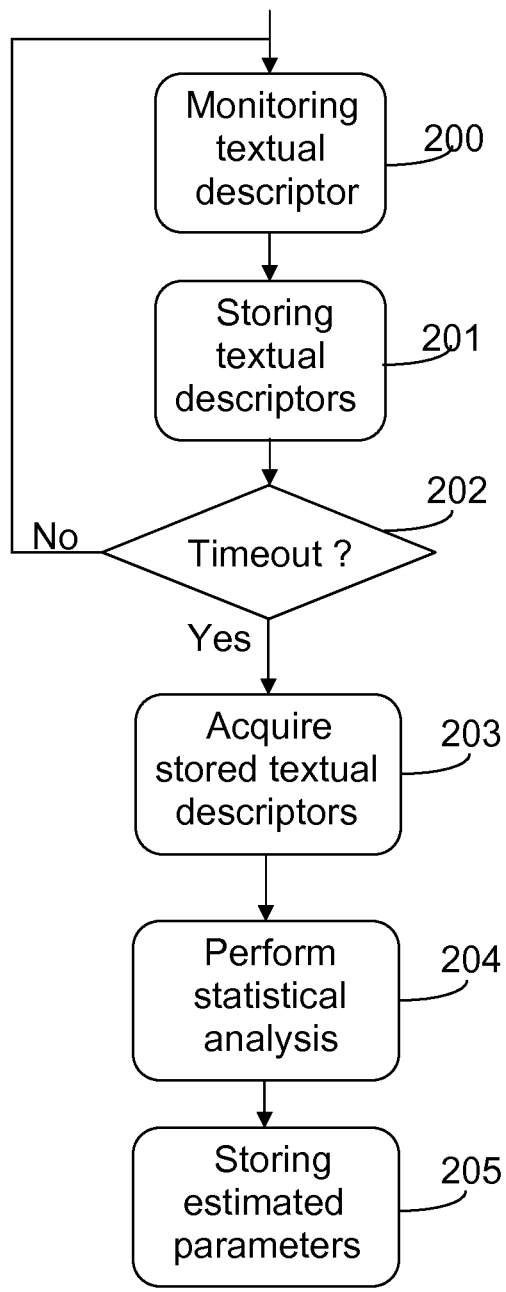
FIG. 2 is a flow chart, illustrating how a statistical model on a number of most probable user constellations may be derived, according to one exemplary embodiment.

The claimed invention address the problem of how to obtain a reliable estimation on a user constellation of a household. The claimed invention also disclose a mechanism for enabling a more efficient personalized selection and distribution of multimedia to the household, on the basis of the estimated user constellation. Such personalized multimedia distribution may include selective distribution of different TV shows, advertisements, and/or other types of information to different households.

One way to resolve the problems mentioned above would be to increase the size of the group of multimedia consumers, ideally to include the entire population of viewers, to establish a non-intrusive technique, and to apply a completely automated procedure. Practically this is of course not doable.

From hereinafter, the suggested estimations will specifically be based on monitored textual descriptors that are associated with TV programs distributed to a household. It is however to be understood that the suggested method and apparatuses will be applicable also for other types of distributed content that comprises audio and/or visual information.

This document suggests a method for reliably estimating a present user constellation of a household, i.e. to estimate which person, or which group of persons, of a household that is/are presently most likely watching the TV programs that are being distributed to the household. By household we refer to a location which may comprise one or more TV sets, each of which may be connected to an IPTV-, mobile TV-, cable TV, or any other type of distribution network that is suitable for distribution of multimedia content to a household.

The suggested method for estimating a present user constellation for a household relies on a statistical analysis that is made on collected information that gives a more or less detailed indication on what type of TV programs that have been distributed to the household during a pre-defined time interval, and that, when monitored during the pre-defined time interval will results in a statistical model. Throughout this document, this type of information will be referred to as textual descriptors.

By later monitoring additional textual descriptors associated with the content distributed to the household on the fly, and by matching, or correlating, this information with the earlier derived statistical model it will be possible to obtain a reliable estimate on a most likely present user constellation of the household. On the basis of such an estimated user constellation associated user preference information can be acquired from the statistical model, in the form of textual descriptors, and provided to a content provider which will be able to offer personalized TV programs, advertisements, or any other kinds of personalized information and services to the household on the basis of the user preference information.

The suggested method can be divided into two separate phases, namely an initial preparation, or modelling phase, which can also be referred to as a training phase, and a subsequent estimating phase, or usage phase.

According to the initial phase, a number of statistical models on the user behaviour of various potential user constellations of a household are derived by performing a statistical analysis on sequences of textual descriptors that are associated with the TV programs that have been distributed to the household on a long term basis. Finally the most probable statistical model for a specific number of users and possible user constellations that may be formed by this number of users are selected and stored.

Once the initial phase has been successfully completed, the selected statistical model can be used for estimating a most probable user constellation in the second, usage phase.

A typical overview of consumption of distributed TV programs at a household having two potential users or viewers will now be illustrated with reference to FIG. 1, where a TV viewing pattern 100 is indicating each occasion when a TV program is being watched by any viewer of the household during seven days period, reaching from Monday to Sunday. In the figure, each active period, such as e.g. time interval 101, is indicated with a box. Each box of TV viewing pattern 100, which may also be referred to as a Time Distribution Vector (TDV), corresponds to a time interval of the day when some TV program is being consumed at the household and is carrying viewable content, which may also be referred to as TV program segments, to the household.

Looking in more detail at sequence 101, namely a sequence of TV program segments that are being watched between 21:30 on Tuesday and 01:45 on Wednesday a Network Operator (NO) will normally only recognise useless information, since the content provided to the households is encoded with low-level features, namely sound and image.

In addition to the conventional TV program content, TV program segments may, however, be accompanied by additional information, in the present context referred to as textual descriptors that has been encoded, typically at the information source, into information that is recognisable by the NO. Such additional information, which may origin e.g. from some kind of metadata, a subtitle stream or manually added tags that are related to a TV program, can be defined as a stream of keywords that gives an indication of the user preferences of the present user constellation.

As can be seen in FIG. 1, a stream 102 of textual descriptors comprises a sequence of textual descriptors 103, comprising "goal" and "score", i.e. expressions that are related to sports, while another subsequent sequence of textual descriptors 104, comprise the expressions "budget", "unemployment" and "costs", i.e. words that are economy related. The textual descriptors represent a form of low-level information, which, if clustered into different concepts, such as e.g. football game, or interest rates can provide a more coherent user preference coding scheme. A plurality of topics, such as e.g. sports, economical, ecological, technical topics may be applied. From the perspective of the NO the TV programs distributed to the household will be seen as a steam of text, i.e. textual descriptors that may be more or less distinctive, depending on the semantics and topics used.

Depending on the textual descriptors used, more or less detailed user profiles or user preferences will be obtainable, simply by monitoring the textual descriptors that are associated with the TV programs being distributed to the household. If different combinations of textual descriptors can be associated with different user or viewer constellations it will be possible to estimate a most likely user constellation, i.e. a most likely combination of users or viewers that are watching TV at a particular time instance. A sequence of such user constellations, from hereinafter referred to as a user constellation sequence of a household, comprising the possible user constellations v1, v2 and v3 that typically are changing from time to time, is illustrated with sequence 105.

While different sequences of textual descriptors 103, 104 may be referred to as observed sequences, i.e. sequences of information that can be recognised by using a suitable monitoring equipment, the described user constellation sequences 105 may instead be referred to as a stream of hidden sequences, i.e. a stream of user constellations that are hidden from, and initially completely unknown to a NO that is monitoring the textual descriptors, while associated TV programs are being distributed to a household. The aim of the present document is to describe the sequence of steps that will make such a hidden sequence visible to the NO. If made visible such a stream of hidden sequences can be analysed and processed so that at any arbitrary time, a present user constellation can be estimated.

If a representative user constellation can be estimated with high accuracy, such information may be used for obtaining associated user preferences, on the basis of which TV programs and/or advertisements can be selectively distributed to the household. Thereby content that better match the personal profile/s of the viewers of the estimated user constellation can be provided to a monitored household.

In the present example the different user constellations v1, v2 and v3 may be representative of a household comprising two persons, A and B, where v1 represents only viewer A, v2 only viewer B, and v3 represents a user constellation comprising both viewer A and viewer B.

The different phases for obtaining basic data to be used for personalized service distribution, will now be described in further detail with reference to FIGS. 2 and 3, respectively.

FIG. 2 refers to a method according to the first phase for estimating a finite number of user constellations on the basis of streams of textual descriptors that have been monitored on a long-term basis, i.e. over a pre-defined time interval typically expiring over a period of days, weeks or months. According to steps 200-203 streams of textual descriptors are monitored and stored for the household during the pre-defined time period.

Once a representative amount of information, i.e. a number of textual descriptor sequences, have been collected and stored, this information can be processed in order to model an estimated pattern of the user behaviour for different user constellations. In step 204, stored textual descriptors are therefore acquired, and in a subsequent step 205 a statistical analysis is performed on the acquired textual descriptors. The statistical analysis comprises deriving, or training, a statistical model, which e.g. may be a dynamic Bayesian network (DBN). Alternative DBN's that may be used for such an estimation are Hidden Markov Models (HMM), Multi-resolution Hidden Markov Models (MHMM) or Hidden semi-Markov Models (HSMM). The result of a trained statistical model will be a number of parameters that correspond to the user behaviour of a number of alternative user constellations.

In a final step 206 the statistical model, i.e. the parameters that are modelling a most likely user behaviour of a number of estimated user constellations are stored for later retrieval e.g. for multimedia service personalization purposes.

FIG. 3 refers to a method for using the statistical model obtained in the first phase for estimating a most probable user constellation for the household by executing what was referred to as the second phase above, i.e. by correlating the statistical model that was previously derived and trained in the first phase, with a user constellation sequence that is monitored on the fly.

In a typical scenario for estimating a present user constellation, such an estimation should be based on textual descriptors that are presently provided to the household, since user constellations typically change on quite a short-term basis, i.e. the estimation is to be performed on the fly.

In a first step 300, a statistical model that has previously been trained and stored, typically as described in step 206 in FIG. 2, is acquired from a storage means. A stream of textual descriptors, provided along with the stream of content to be distributed to the household, is then monitored, as indicated in a next step 301, and in a subsequent step 302 a most probable user constellation is then estimated for the household. According to the suggested estimation mechanism, such an estimation is achieved by matching, or correlating, the stream of textual descriptors monitored in step 301 with the statistical model.

In a typical scenario, one or more viewers, may be watching a TV show that is sports related. After having derived with the estimate that user constellation v1 is presently watching TV, textual descriptors associated with v1 may indicate a specific interest in nature and environmental shows. An advertising agency having a campaign with a car manufacturer for showing car advertisements during commercial breaks may personalize the advertisement distribution by selecting to distribute an advertisement for a hybrid car model to the household of user constellation v1. Such a segmentation is not only usable during selective distribution of advertisements, but can also be very useful e.g. when a plurality of alternative versions of TV programs are available for selective distribution to different households.

According to one embodiment the statistical modeling may be base on the Hidden Markov Model (HMM). In the context of HMM, the user constellations correspond to unseen, or hidden states.

A HMM has a sequence of observations: $o_1, o_2, \ldots, o_M$, where M is the total number of observations. These observations can be seen as the alphabet or a codebook for the problem under consideration, and in the present context, each observation corresponds to a sequence of textual descriptors, as described above. From that and only that sequence of observations it will eventually be possible to estimate a statistical model having N hidden states, or user constellations, $v_1, v_2, \ldots, v_N$. At first the NO only has knowledge of a sequence of textual descriptors, such as e.g. sequence 102, but after having processed the statistical model, a most probable user constellation will have been estimated.

Figure 6:
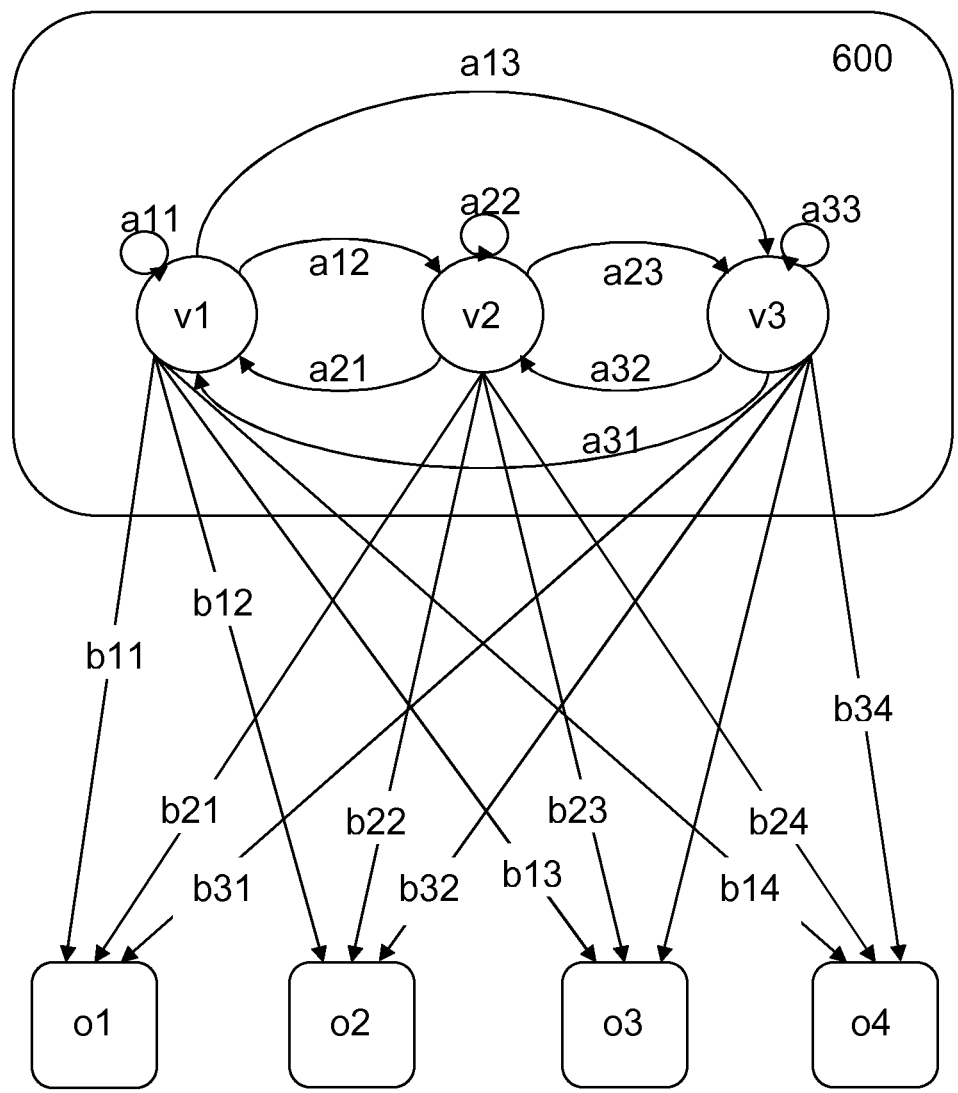
FIG. 6 is an illustration of a statistical model on a scenario with three user constellations and four observations, according to one exemplary embodiment.

FIG. 6 is a general illustration of a statistical model that is the result of a statistical analyses performed on a HMM. A household 600 may be associated with N hidden states. In the present example household 600 is assumed to host two viewers, and, thus, three hidden states, namely one per viewer and one for both of them, can be defined by $v_1$, $v_2$ and $v_3$, respectively. When applying the HMM it is assumed that the viewers of a household change positions in front of the TV and select different TV programs at fixed time intervals. A viewer might stay in front of the TV for more than one time interval.

Initially there is an unknown transition probability, between each assumed user constellation, where e.g. the transition probability between $v_1$ and $v_2$ is identified as a12 in the figure, while the transition probability between v2 and $v_1$ is indicated as $a_{21}$ in FIG. 6. Consequently, the transition probability for user constellation v1 to maintain is indicated as $a_{11}$. If for example user constellation $v_1$ is watching TV, the probability for $v_1$ to be replaced by $v_2$ is $a_{12}$, whereas the probability that $v_1$ stay in front of the TV and $v_2$ joins $v_1$ is $a_{13}$, since $v_3$ represents the user constellation comprising both viewers.

According to the present example, each user constellation can choose one of four observations, or sequences of textual descriptors, $o_1, o_2, o_3,$ or $o_4$. Even though the present example refers to 4 different observations, it is to be understood that the number of observations may vary, depending on the level of abstraction that the NO chooses to inject into the system. Consequently, one observation may correspond to one or more textual descriptors. In addition probabilities, $b_{ik}$, where i equals 1 to 4, which are also unknown from the beginning, represents the respective probabilities of a specific user constellation v1, v2, v3, v4 selecting a certain observation, where k equals 1 to 4, respectively.

As time passes by, viewers interchange position in front of the TV, i.e. transitions between different user constellations occur, and they select different programs according to their personal preferences. This is the mechanism which generates the different observations o1, o2, o3, o4, represented by the textual descriptors.

It is commonly known that the problems of estimating the most probable statistical model, i.e. N, and the unknown probabilities, i.e. $a_{ij}$ and $b_{ik}$, associated with the selected statistical model are well defined within HMM and there is a plethora of algorithms, such as e.g. the Baum-Welsh algorithm and variants of this algorithm that are suitable for use on different variations of the HMM.

In working towards the first step, textual descriptors, collected over a period of time, are used for training a HMM model, where different possible values for N, such as e.g. 1, 2, 3, are selected and for each N, respective sets of parameters $a_{ij}$ and $b_{ik}$ are estimated. Such a training procedure may be achieved e.g. by using the Baum-Welch algorithm. Finally, the HMM model, i.e. the N, $a_{ij}$ and $b_{ik}$ that best fits the observation, or the model for which the training error is the lowest, is chosen.

In the second step the selected statistical model, i.e. the selected parameters, are used to estimate a most likely present user constellation, $v_i$.

In the second phase a new, stream of textual descriptors is monitored and correlated with the trained HMM model, such that the user constellation that is presently most probable is estimated. This phase can also be referred to as the so-called "second canonical problem" in the HMM theory, and may be solved e.g. by using the well known Viterbi algorithm.

While the first phase is performed off-line and can be repeated during random intervals over the year, the second phase is run on-the-fly, i.e. while the TV program is consumed. The first phase, which may also be referred to as the training phase, assures that the system is made aware of the viewers preferences, while the purpose of the second phase is to estimate which constellation of users that is using a TV set at a given time interval.

The scenario described above assumes that the viewers exhibit fixed preferences, and, thus, has a fixed user behaviour over the course of time. A more realistic alternative is to assume some periodicities in the user behaviour. This would mean that during different days of the week, month and year the viewers exhibit different preferences, which will affect when different watchers will watch TV and what they will watch. In such a case the analysis of the HMM needs to be extended on a multi-level, or multi-resolution. Such a situation may be met by instead using a Multi-resolution Hidden Markov Model (MHMM).

Figure 7:
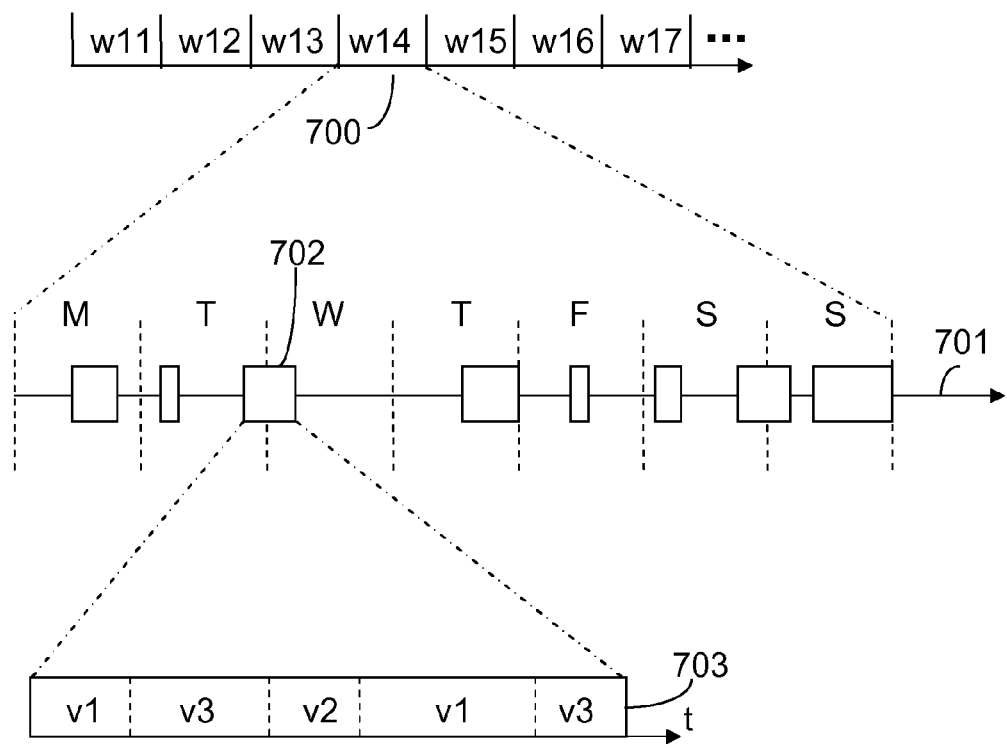
FIG. 7 is an illustration exemplifying a scenario depicting a two level structure.

FIG. 7 is an illustration which exemplifies such a scenario by depicting a two level structure, which is divided into both weeks of the year and days of the week. A plausible scenario is that during different weeks the TV viewing patterns will vary according to a number of circumstances. Consequently each week, such as e.g. week 14 (w14) 700, will exhibit a different distribution of viewing hours 701, which may also be referred to as a Time Distribution Vector (TDV), where each sequence of user constellations, such as e.g. sequence 702 is represented by a sequence of user constellations 703.

The TDVs are the actual sequences of textual descriptors, or observations, that the system monitors for a household each individual week.

In order to tackle the dimensionality problem of having to analyse an infinite number of TDV, vector quantization (VQ) may be employed. With VQ the potentially infinite number of TDVs are clustered into a limited number of observations.

Instead of making the assumption that each user constellation emits one observation it can be assumed that each user constellation can emit a variable number of observations/sequences of textual descriptors.

For that reason yet another alternative model comes in the form of a semi-Markov HMM (HSMM). This alternative approach has the same starting point as the previous ones, namely that a number of viewers select different TV programs.

Figure 8:
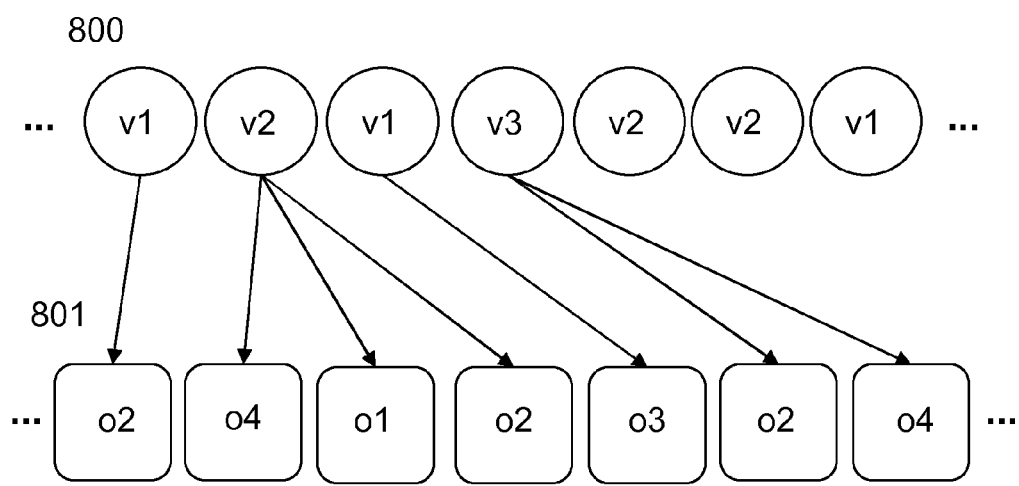
FIG. 8 is an illustration of applying HSMM.

FIG. 8 illustrates a scenario where HSMM may typically be applied, where the user behavior can be explained, such that each user constellation of the possible user constellations 800, in this case $v_1$, $v_2$ and $v_3$, may make a series of selections 801 of observations/sequences of textual descriptors before being replaced by a new user constellation. When a user constellation has been determined, user preference information with different probabilities can be identified, such that i.e. for user constellation $v_1$, user preference information that relates to textual descriptors defined by o2 is relevant, while for user constellation $v_2$, user preference information that relates to observations o4, o1, o2 are available with different probabilities. In a typical scenario, the one or more observations with the highest probability is/are chosen as the user preferences associated with an estimated user constellation. This procedure refers to a filtering process where the most relevant textual descriptors are selected, and may also be referred to as data mining or knowledge discovery. How to execute data mining as such is already commonly known in the art, and for that reason, this step will not be described in any further detail in this document.

A procedure which User preference information derived using any other of the mentioned models may be selected in a corresponding way.

Figure 4:
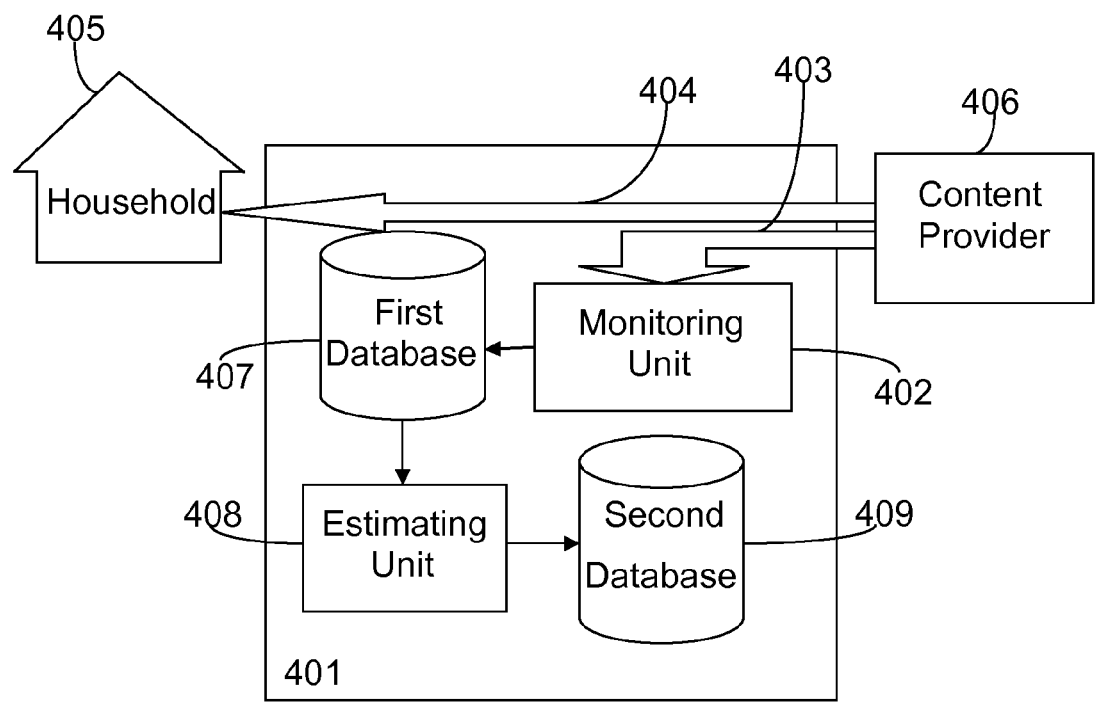
FIG. 4 is a block scheme, illustrating an apparatus for determining a statistical model on the basis of monitored textual descriptors, according to one exemplary embodiment.

A typical configuration for collecting and processing information that is associated with the TV programs that are distributed to a household will now be described in more detail with reference to FIG. 4.

In a multimedia distribution network 400 an arrangement 401 is provided with a monitoring unit 402 that is configured to monitor textual information, i.e. textual descriptors 403 that are associated with a multimedia sequence 404, which in the present context refers to the content of a selected TV program that is distributed to a household 405 from a content provider 406. Such textual information may comprise meta data, e.g. from an Internet Movie Data Base (IMDB), subtitle information or tags, that may have been extracted automatically from the movies, e.g. by using content based analysis, or acquired from a separate source that is distributing the textual information in parallel to the TV program content. Providing textual information to multimedia content is previously known and can be done according to any conventional method. For that reason this process will not be discussed any further in this document.

This monitoring procedure, involves monitoring of streams of textual descriptors whenever this information is required for user constellation estimation, and may typically be performed on a, more or less, constant basis.

The monitored streams of textual descriptors are stored in a first database 407, from where this accumulated information can later be obtained and used as input data for executing a statistical analysis on the stored content. In the present example, such a statistical analysis process is executed by estimating unit 408, which is connected to a second storing unit, or database 409, where the resulting statistical models, or user constellation profiles, are stored.

In addition to the streams of textual descriptors, estimating unit 408 may also use additional data that may be obtained from the first database or any other database (not shown) as input for the statistical analysis. Such data may e.g. comprise information as to the possible number of users in the respective household, which may simplify the training of the statistical model. Additional data may also comprise socio-economical information and demographic data.

When applying the second phase, i.e. the phase where a user constellation sequence is estimated on the basis of the user constellations obtained in the first phase described above, an arrangement according to the one which will now be described with reference to FIG. 5 may be applied.

Figure 5:
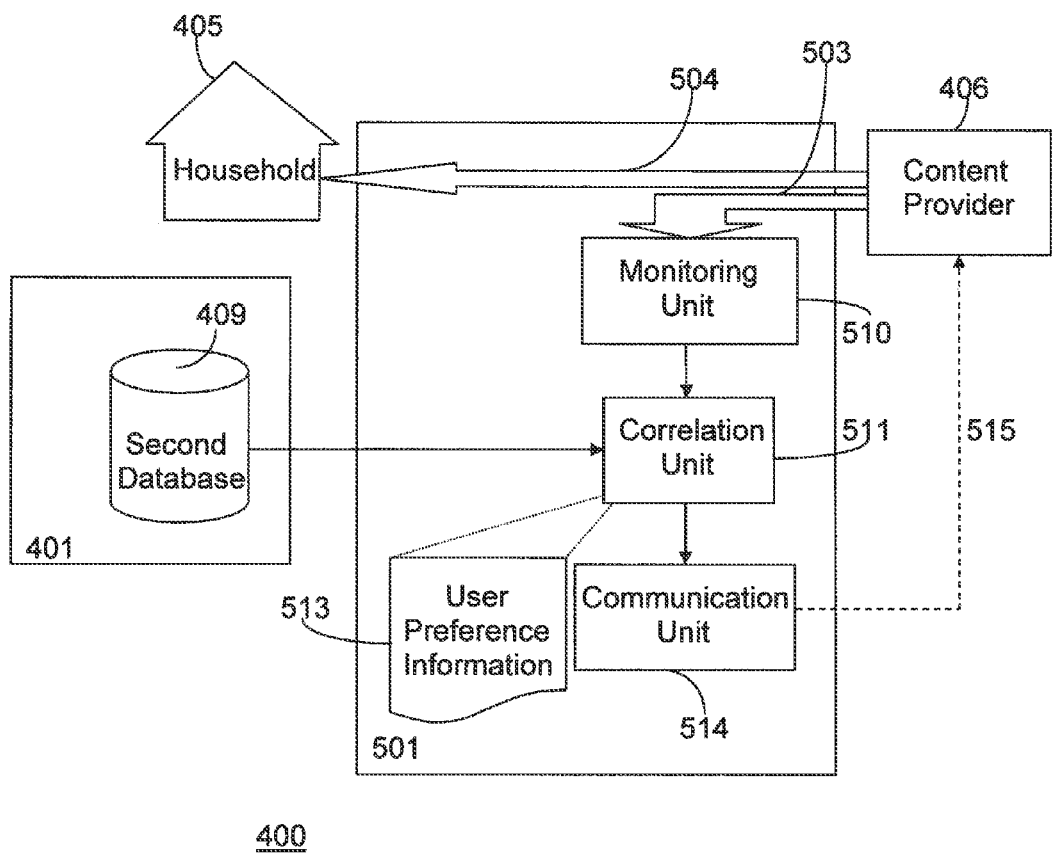
FIG. 5 is a block scheme, illustrating another apparatus for estimating a most probable user constellation, according to one exemplary embodiment.

FIG. 5 refers to the same multimedia distribution network 400 as was described above. Also in this phase, a household 405 is receiving multimedia services, typically TV programs, that are provided from a content provider 406.

While the configuration of arrangement 401, that was described above and that referred to the first phase, i.e. to the statistical model training phase, was configured to collect textual descriptor data on a long term basis, in order to obtain a statistical model that is significant for the user behavior of the household 405 during a monitored time interval, the arrangement 501 of phase two is to be used for monitoring a sequence of textual descriptors on a short term basis, on the fly. A monitoring unit 510 is therefore configured to monitor a new stream of textual descriptors 503 that are associated with a new multimedia sequence 504, carrying TV program content that is distributed to household 405.

Arrangement 501, also comprises a correlation unit 511, that is configured to acquire the pre-configured statistical information, i.e. the parameters making up statistical models from a database, in this case, the second database 409 of arrangement 401, and to estimate a user constellation by correlating or matching the monitored stream of textual descriptors 503 with the statistical model.

The correlating/matching may be obtained by processing the obtained data e.g. using a Viterbi algorithm. Such a matching will result in a most probable user constellation which may be used by the content provider 406, such as e.g. a TV content provider or an advertising agency, as a basis for personalizing the upcoming services provided to household 405. For this purpose, arrangement 501 also comprises a communication unit 514, that is adapted to acquire user preference information associated with the estimated user constellation, which is typically stored as a database of observations, or sequences of textual descriptors indicating the preferences of the respective user constellation, and provide 515 this information to a content provider 406, such that the content provider 406 will be able to personalize its content when distributed to the household 405.

It is to be understood that while the first phase, or the training phase, described above provides data that gives a long term statistical basis, the second phase is providing an estimate of a present user behavior and a present user constellation. Therefore, the resulting user constellation sequence will be relevant more or less on the fly.

A typical scenario for using an estimated user constellation could be to enable an advertising agency to customize advertisements for the multimedia consumers of household 405 on the basis of the obtained user preference information 513. In another alternative scenario, content provider 406 could instead customize the requested services on the basis of the obtained user preference information 513.

Even though arrangements 401 and 501 only describe how multimedia content distributed to one household is being monitored and user for content personalization, it is to be understood that a typical operator network will be provided with corresponding functionality that is configured to monitor multimedia content distributed to a large amount of households, such that personalization of advertisements or provided services may be achieved on a per household basis for all or a sub group of households.

It is also to be understood that the arrangements described above with reference to FIGS. 2 and 3, merely illustrates one exemplary configuration of functional units presented in a logical sense, while the skilled person may choose to implement the described functions in a number of alternative ways, both as separate entities 401,501, as well as one single, integrated entity.

While the invention has been described with reference to specific exemplary embodiments, the description is generally only intended to illustrate the inventive concept and should not be taken as a limitation of the scope of the invention, which is defined by the appended claims.

ABBREVIATIONS

| | |
|---|---|
| DBN | Dynamic Bayesian Network |
| HMM | Hidden Markov Model |
| IMDB | Internet Movie Data Base |
| MHMM | Multi-resolution Hidden Markov Model |
| HSMM | Hidden Semi-Markov Model |
| TDV | Time Distribution Vector |
| VQ | Vector Quantization |

The invention claimed is:

1. A method at a multimedia distribution network of estimating a present user constellation of a household, the method comprising:

monitoring a sequence of textual descriptors that are associated with a multimedia sequence that is being distributed to the household, wherein the sequence of textual descriptors is determined from subtitle information and is distributed to the household in a stream along with a stream of associated multimedia content;

acquiring, from a storing unit, a set of probabilistic parameters of a statistical model that is based on a plurality of sequences of textual descriptors that have previously been provided to the household; and estimating a present user constellation by correlating the monitored sequence of textual descriptors being distributed with the probabilistic parameters of the statistical model, wherein the statistical model is determined by executing the following steps:

acquiring the plurality of sequences of textual descriptors that have previously been provided, monitored and stored, each sequence of textual descriptors being associated with and determined from subtitle information of a multimedia sequence that has previously been provided to the household and representing a sequence of observations;

performing a statistical analysis on the acquired plurality of sequences of textual descriptors that have previously been provided, such that the statistical model, defined by a finite number, N, of most likely user constellations representing a sequence of hidden states, and the set of probabilistic parameters associated with state transitions of the most likely user constellations, is generated; and storing the probabilistic parameters that define the statistical model.

2. The method according to claim 1, wherein the estimating step comprises:

estimating the present user constellation by executing on the fly Viterbi decoding on the stream of the sequence of textual descriptors being distributed and the set of probabilistic parameters.

3. The method according to claim 1, further comprising:
acquiring user preference information on the estimated present user constellation; and
providing the user preference information to a content provider, thereby enabling the content provider to selectively customize multimedia content provided to the household on the basis of the provided user preference information.

4. The method according to claim 3, wherein the customized multimedia content comprises any of: video, audio, TV programs, or advertisements.

5. The method according to claim 1, wherein the statistical analysis is further based on additional, user specific information, comprising at least one of: possible number of users at the household, socioeconomic information or user preferences associated with the household.

6. The method according to claim 1, wherein the performing step is executed by using a Baum-Welch algorithm on the acquired plurality of sequences of textual descriptors that have previously been provided.

7. The method according to claim 1, wherein the statistical model is generated by a Dynamic Bayesian Network.

8. The method according to claim 7, wherein the Dynamic Bayesian Network is a Hidden Markov Model.

9. The method according to claim 7, wherein the Dynamic Bayesian Network is a Multi-Resolution Hidden Markov model.

10. The method according to claim 7, wherein the Dynamic Bayesian Network is a Hidden Semi-Markov Model.

11. The method according to claim 1, wherein the monitoring step comprises monitoring the sequence of textual descriptors being distributed from metadata, subtitle information or tag information, that is being distributed parallel to its associated multimedia sequence.

12. The method according to claim 1, wherein the distributed multimedia sequence comprises an audio or a video stream.

13. An arrangement in a multimedia distribution network for estimating a present user constellation of a household, the arrangement comprising:
a monitor adapted to monitor a sequence of textual descriptors that is associated with a multimedia sequence that is being distributed to the household, wherein the sequence of textual descriptors is determined from subtitle information and is distributed to the household in a stream along with a stream of associated multimedia content; and
a correlator adapted to acquire a set of probabilistic parameters of a statistical model from a storing unit, the statistical model being based on a plurality of sequences of textual descriptors that have previously been provided to the household, and to estimate a present user constellation by correlating the monitored sequence of textual descriptors being distributed with the probabilistic parameters of the statistical model,
wherein the statistical model is determined by executing the following steps:
acquiring the plurality of sequences of textual descriptors that have previously been provided, monitored and stored, each sequence of textual descriptors being associated with and determined from subtitle information of a multimedia sequence that has previously been provided to the household and representing a sequence of observations;
performing a statistical analysis on the acquired plurality of sequences of textual descriptors that have previously been provided, such that the statistical model, defined by a finite number, N, of most likely user constellations representing a sequence of hidden states, and the set of probabilistic parameters associated with state transitions of the most likely user constellations, is generated; and
storing the probabilistic parameters that define the statistical model.

14. The arrangement of claim 13, wherein the correlator is further adapted to estimate a most probable present user constellation by executing on the fly Viterbi decoding on the sequence of textual descriptors being distributed and the acquired set of probabilistic parameters.

15. The arrangement of claim 13, further comprising:
a communication unit adapted to acquire user preference information on the present user constellation and to provide the user preference information to a content provider, thereby enabling the content provider to customize multimedia content provided to the household on the basis of the provided user preference information.

16. multimedia distribution network, comprising an arrangement according to claim 13.

* * * * *

UNITED STATES PATENT AND TRADEMARK OFFICE
CERTIFICATE OF CORRECTION

PATENT NO. : 8,898,689 B2  
APPLICATION NO. : 13/382559  
DATED : November 25, 2014  
INVENTOR(S) : Georgakis Page 1 of 1

It is certified that error appears in the above-identified patent and that said Letters Patent is hereby corrected as shown below:

On Title Page 2, item (56), under "OTHER PUBLICATIONS", in Column 2, Line 3, delete "Yamamoto" and insert -- Yamamoto, --, therefor.

In the Specification

In Column 4, Line 25, delete "unit (409)" and insert -- unit --, therefor.

In Column 7, Line 25, delete "steps 200-203" and insert -- steps 200-202 --, therefor.

In Column 7, Line 32, delete "step 204," and insert -- step 203, --, therefor.

In Column 7, Line 33, delete "step 205" and insert -- step 204 --, therefor.

In Column 7, Line 44, delete "step 206" and insert -- step 205 --, therefor.

In Column 7, Line 61, delete "step 206" and insert -- step 205 --, therefor.

In Column 7, Line 65, delete "step 301," and insert -- step 300, --, therefor.

In Column 8, Line 2, delete "step 301" and insert -- step 300 --, therefor.

In the Claims

In Column 14, Line 45, in Claim 16, delete "multimedia" and insert -- A multimedia --, therefor.

Signed and Sealed this  
Eighteenth Day of August, 2015

Michelle K. Lee  
*Director of the United States Patent and Trademark Office*